United States Patent Office 2,743,288
Patented Apr. 24, 1956

2,743,288

PRODUCTION OF MONOSULFONATED CARBOXYLIC ACIDS AND THEIR ESTERS

Walter H. C. Rueggeberg, Atlanta, and Thomas W. Sauls, College Park, Ga., assignors to Tennessee Corporation, New York, N. Y., a corporation of New York No Drawing. Application June 24, 1953, Serial No. 363,934

6 Claims. (Cl. 260—400)

This invention relates to a process for the production of monosulfonated unsaturated carboxylic acids and their esters. This application is a continuation-in-part of our prior application Serial No. 291,328, filed June 2, 1952, now abandoned.

Because of their surface active properties and extended use as wetting, rewetting, emulsifying, dispersing and similarly used agents in the textile as well as in numerous other industries, "sulfonated" oils have been known and manufactured for a long time. In prior patents and literature pertaining to this subject, however, the term "sulfonated" often has been erroneously applied to materials which are the addition products of sulfuric acid to an olefinic linkage or the reaction product of an alcohol with a sulfating agent such as $H_2SO_4$, oleum, $SO_3$, or $ClSO_3H$. These latter types of materials are really esters of sulfuric acid, i. e., they are sulfates rather than sulfonates, the latter term being properly applied only to those materials containing a direct carbon to sulfur linkage. These two types of materials can be represented by the following formulae:

(1)
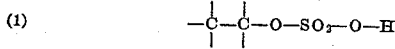

a sulfate, or alkyl sulfuric acid (2)

a sulfonate

The alkyl sulfuric acids, or sulfates, are soluble in water and, if the hydrocarbon part of the molecule is sufficiently large ($C_8$ to $C_{20}$), exhibit surface activity. Examples of such sulfates are:

(3) The addition products of $H_2SO_4$ at an olefinic linkage, as in the case of sulfated esters of unsaturated fatty acids such as propyl oleate.

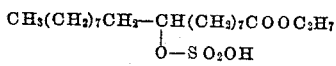

(4) Products formed by reaction between a sulfating agent and an —OH group, as in the case of sulfated castor oil.

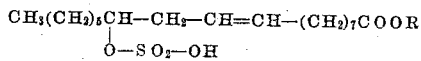

Where R represents one-third of a glycerine molecule, the other two-thirds being usually esterified with unsulfated fatty acid.

(5) Products formed by reaction between a sulfating agent and the terminal —OH groups of long chain alcohols, as in the case of sulfated lauryl alcohol.

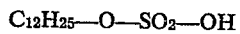

Sulfates of the above types are usually used as salts, most frequently as sodium salts. In many cases, however, such sulfates or their salts are undesirable because of their instability toward hydrolysis and heat. If such an ester of sulfuric acid is permitted to stand in water under acidic conditions, decomposition takes place yielding an inorganic sulfate and an alkanol, the decomposition being accelerated by heat:

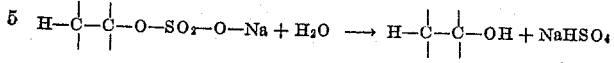

These decompositions often become troublesome when sulfated materials have to be stored in considerable quantities before shipment or use. Furthermore, when sulfuric acid or oleum is used as a sulfating agent for olefins or alcohols, an excess of the sulfating agent is required to obtain practical yields of the sulfated product in most instances. When neutralized, this excess becomes sodium sulfate which is undesirable in many cases, but it is difficult and costly to remove either the excess sulfuric acid from the unneutralized sulfated product or the $Na_2SO_4$ from the neutralized sulfated product.

A much more desirable configuration for these types of materials is that where true sulfonation exists, that is, where there exists a carbon to sulfur linkage of type (2), because hydrolysis of the sulfonic acid or its salts is impossible under nearly all conditions of acidity and basicity and over a wide temperature range. Thus it has been proposed to produce stable carbon to sulfur linkages at the double bond of unsaturated materials by means of the well known carbyl sulfate reaction. This reaction, in order to obtain a high yield, requires at least two moles of $SO_3$ per mole of unsaturated material. Carbyl sulfate formation can be expressed as follows:

(6)
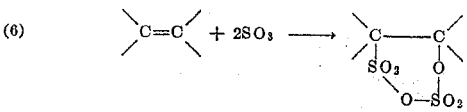

The carbyl sulfate can then be hydrolyzed to give a sulfonate-sulfate as follows:

(7)
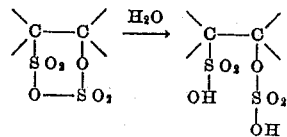

Under more vigorous conditions the sulfonate-sulfate grouping can be further hydrolyzed to a hydroxy-sulfonate as follows:

(8)
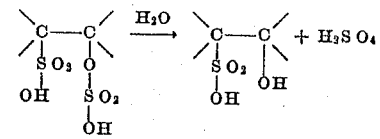

It will be seen that products of types (6), (7) and (8) each contain a carbon to sulfur linkage, but also that addition has taken place at both carbon atoms at the double bond, requiring two moles of $SO_3$, and that unsaturation has disappeared. These products and their sodium and other salts possess surface activity and wetting properties, but in general are inferior in these respects to well known and widely used sulfated oils (e. g., Twitchell oils), while their preparation is more complex and excessive amounts of sulfonating agent are required.

We have now discovered that when unsaturated carboxylic acids are reacted with sulfur trioxide dissolved in liquid sulfur dioxide, the amount of sulfur trioxide being limited to 1.0–1.25 moles per mole of unsaturated acid, a very high yield of monosulfonated unsaturated acid is obtained. Under these conditions $SO_3$ reacts with only one of the carbon atoms at or near the double bond and with its attached hydrogen atom to form a true sulfonic acid linkage, leaving the double bond free to a large degree. This reaction can be expressed as follows:

(9) 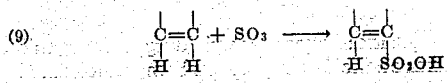

The products thus obtained are characterized by unusually high resistance of the sulfonic acid group towards hydrolysis and heat, and by the fact that they contain only small amounts of byproduct salts after neutralization because of the completeness of the sulfonation reaction. Moreover, aqueous solutions of the salts of these monosulfonated unsaturated acids exhibit excellent surface-active characteristics and are useful for many industrial purposes. For example, they are well suited for the clarification of viscose solutions in the rayon industry, a purpose for which sulfated oils (i. e., "Prestabit" oil) are now employed.

We have also found, contrary to expectations, that the above reaction (9) is confined to the free unsaturated acids; that is, it does not take place when their esters are subjected to the same treatment. When 1.0 to 1.25 moles of $SO_3$ are used, these esters are only incompletely sulfonated (about 40–50%) by a reaction which appears to be of the carbyl sulfate type (6), and at least two moles of $SO_3$ are required to obtain high yields as pointed out more fully hereinafter.

Although the exact explanation of these observed results is difficult to ascertain and prove, the following theory appears to fit the facts and is believed to be correct. When $SO_3$ comes in contact with a carboxylic acid, the following reaction may take place at the free carboxyl group:

(10) 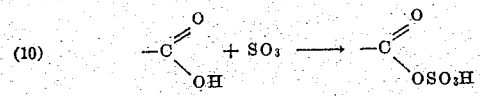

The sulfate group thus formed is very unstable and hence may decompose to give rise to the following reaction:

(11) 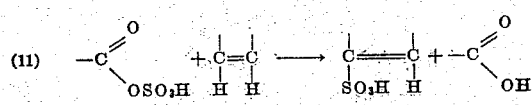

This mechanism explains the high degree of conversion of the free unsaturated acids, and also shows why the same result is not obtained in the case of their esters.

Any unsaturated carboxylic acid can be used in the range of four to thirty-six carbon atoms, including monocarboxylic and polycarboxylic acids, monounsaturated and polyunsaturated acids, and mixtures of such materials. Moreover, the presence of substantial quantities of saturated acids or other inert substances such as ethers is not objectionable since they do not react under the conditions of the process.

The reaction can be carried out batchwise in bulk, or the sulfonating agent (i. e., $SO_3$ dissolved in liquid $SO_2$) and the acid can be supplied continuously at equivalent rates to a spinning disk so that thin films are formed and intimately mixed on the disk and discharged rapidly therefrom by centrifugal force. A sulfonation method and apparatus of the latter type are disclosed in the copending application of Walter H. C. Rueggeberg et al., Serial No. 182,730, filed September 1, 1950, now abandoned. The reaction is essentially instantaneous and takes place rapidly at the temperature of liquid $SO_2$ under atmospheric pressure, say $-10°$ C. Hence the use of higher temperatures and pressure equipment is unnecessary.

To show the completeness of reaction, the following table gives the results obtained when one mole of oleic acid was sulfonated with varying amounts of $SO_3$ dissolved in liquid $SO_2$. The oleic acid used contained 8–10% of saturated fatty acids which under the conditions of sulfonation (atmospheric pressure and $-10$ to $0°$ C.) did not react.

| Run No. | Mole Ratio of $SO_3$ to Oleic Acid | Percent Conversion of Total Oil | Percent Conversion Based in 90–92 Percent Oleic Content of Total Oil |
|---|---|---|---|
| 1 | 1.00 | 77 | 84–86 |
| 2 | 1.15 | 84 | 91–93 |
| 3 | 1.25 | 85 | 92–94 |

The $SO_3$ content after isolation and drying of the monosodium salt of the sulfonated product obtained from Run 3 was found to be 20.7%. The theoretical $SO_3$ content of the monosodium salt of monosulfonated oleic acid is 19.7%.

To verify the above indication that monosulfonation occurs nearly exclusively, these products can be analyzed further from the standpoint of caustic consumption required for neutralization, unsulfonated residual materials, and inorganic salt formation ($Na_2SO_4$). It will be evident that each mole of combined $SO_3$ will require only one mole of base for neutralization of the resulting sulfonic acid, whereas two moles of base will be required for the neutralization of each mole of uncombined $SO_3$ which, after hydrolysis of the product-mixture, appears as $H_2SO_4$. By analyzing for the amount of inorganic salts present ($Na_2SO_4$ in the case of an NaOH neutralization), determining the amount of residual unsulfonated materials (by extraction of the same with petroleum ether from an aqueous solution of the product), and measuring accurately the consumption of base, it can be clearly shown that virtually none but the monosulfonated product has been formed. Thus for Runs 1 and 2 of the preceding table the following data were found and results calculated:

| Run No. | Grams $SO_3$ Used | Grams Oleic Acid [1] | Grams NaOH Required to pH 5 | Grams Unsulfonated Material Extracted | Grams Inorganic Salts Formed as $Na_2SO_4$ |
|---|---|---|---|---|---|
| 1 | 37.8 | 133 | 18.9 | 30.7 | 12.5 |
| 2 | 39.1 | 121 | 19.6 | 19.8 | 13.7 |

[1] Purity 90–92 percent.

For Run No. 1, 12.5 grams of $Na_2SO_4$ were equivalent to 7.05 grams of $SO_3$. The amount of oleic acid sulfonated was equal to 133 grams less 30.7 grams or 102.3 grams (0.363 mole), and the amount of $SO_3$ combined with the oleic acid was 37.8 grams less 7.05 grams or 30.75 grams (0.384 mole). Therefore, the mole ratio of organically combined $SO_3$ to reacted oleic acid is 1.06. Similarly for Run 2 the mole ratio is 1.09.

The above data, together with the qualitative finding of the existence of a considerable degree of unsaturation in the sulfonated product, prove conclusively the predominance of monosulfonation in this process. Because only one mole of $SO_3$ (or only a slight excess) is utilized in producing a yield of sulfonated material that is above 90% based on the unsaturated acid content, and because the sulfonated material exhibits a high degree of unsaturation, it follows that the structure of the product is predominantly one of the following types or one closely related to them:

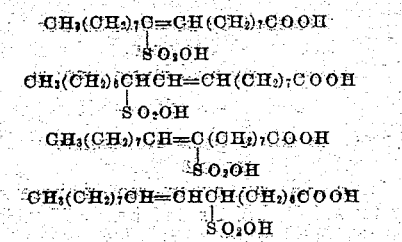

Although direct analysis of the product is somewhat difficult it can be achieved by utilizing a combination of methods consisting of determination of unsaturation using standard bromine addition technique, determination of hydroxyl groups present by acetylation, and elemental analyses for carbon, hydrogen and sulfur. Hydroxy sulfonic acids can be formed either through the carbyl sulfate reaction of Formula 6 due to excess $SO_3$ used, or through the addition of the intermediate product of Formula 10 to the double bond as follows:

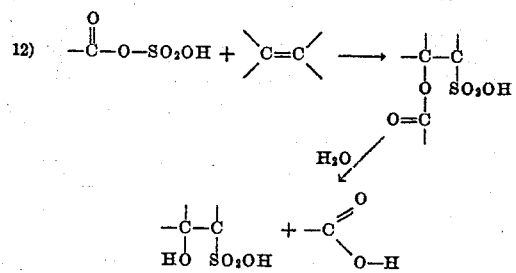

Consequently the product may contain, in addition to the predominant unsaturated monosulfonated oleic acid, a smaller amount of monosulfonated hydroxy stearic acids believed to have the following or similar structures:

(13)   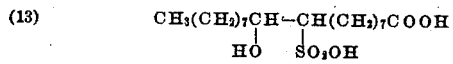

or

(14)   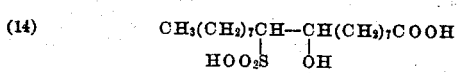

Thus in the case of monosulfonated oleic acid the neutralized, oil-free product contains 25–30 weight percent of hydroxy sulfonate.

Also it can be seen from the above data as to Runs 1, 2 and 3 that the amount of organically combined sulfur is slightly greater than one mole per mole of oleic acid, indicating the presence of minor amounts of disulfurized material, probably sulfonate-sulfates, and that the amount of this disulfurized material increases as the amount of excess $SO_3$ is increased above one mole per mole of oleic acid.

Experience has shown that only about 60–90% of the unsaturation present is detectable by Wijs' method, and that experimental determination of the hydroxy monosulfonate content and of the excess sulfur content of the neutralized oil-free product is a more reliable indication of the amount of monosulfonated unsaturated material. The following table shows the results thus obtained in the case of monosulfonated oleic acid:

| Mole Ratio $SO_3$ to Oleic Acid | Weight Percent Disulfurized Product, found | Weight Percent Hydroxy-sulfonated Acid, found | Weight Percent Monosulfonated Unsaturated Acid (by difference) |
|---|---|---|---|
| 1.00 | 7–9 | 20–30 | 61–73 |
| 1.15 | 10–12 | 20–30 | 58–70 |
| 1.25 | 17–30 | 20–30 | 40–63 |

As another example, neutralized oil-free monosulfonated undecylenic acid may be expected to contain as high as 91% unsaturated sulfonate.

Based on the elemental analyses and the percentages of hydroxy sulfonate found, the composition of the final product is as follows:

| Compound No. | Structure | Calc'd Molecular Weight | Theoretical Composition Weight Percent (Calc'd) | | |
|---|---|---|---|---|---|
| | | | Sulfur | Carbon | Hydrogen |
| 1 | CH$_3$(CH$_2$)$_7$CH=C(CH$_2$)$_7$COONa  (SO$_3$Na) | 406.68 | 7.88 | 53.20 | 7.93 |
| 2 | CH$_3$(CH$_2$)$_7$CH—CH(CH$_2$)$_7$COONa  (SO$_3$Na, OH) | 424.69 | 7.55 | 50.95 | 8.07 |
| 3 | CH$_3$(CH$_2$)$_7$CH—CH(CH$_2$)$_7$COONa  (SO$_3$Na, OSO$_3$Na) | 526.74 | 12.17 | 41.08 | 6.31 |
| | | | Found | | |
| | | | 9.11 | 50.45 | 7.97 |

Hydroxy sulfonate found 28.3 wt. percent.

Based on the carbon and hydrogen analyses, the following is the composition of the product:

| Compound No. | Weight percent in Product | Percent Carbon | Percent Hydrogen | Percent Sulfur |
|---|---|---|---|---|
| 1 | 54.3 | 28.89 | 4.31 | 4.28 |
| 2 | 28.3 | 14.42 | 2.28 | 2.14 |
| 3 | 17.4 | 7.14 | 1.10 | 2.12 |
| Total | | 50.45 | 7.69 | 8.54 |
| Total found | | 50.45 | 7.97 | 9.11 |

Combined $SO_3$ to oleic acid ratio=1.0 to 1.1; found independently by $SO_3$ consumption=1.06 to 1.09 (see above).

It can readily be seen that there is excellent agreement between elemental analyses for carbon, hydrogen and sulfur found and those based on the composition. There is equally good agreement between the combined $SO_3$/oleic acid ratio found by elemental analyses compared with that found by the $SO_3$ consumption in the synthesis.

It will be seen from the above data that the amount of unsaturated material retained in the product is better than 50 weight percent; as shown above, moreover, the hydroxysulfonate present is the result of the monosulfonation procedure instead of disulfonation followed by hydrolysis of the sulfate radical as is normally assumed. The product contains only 17.4% of disulfurized material, the remainder of 82.6 being monosulfonated, and about 66% of the monosulfonated portion being still unsaturated.

When neutralized with one mole of base, only the SO₂OH group of the sulfonated acid is transformed into a salt since this group is much more strongly acidic than the COOH group. Aqueous solutions of these mono salts exhibit good surface active characteristics and wetting times as stated above. For example, in the case of the monosodium salt of monosulfonated oleic acid, wetting times for various concentration in water are shown in the following table:

| Conc., Percent Na Salt of Oleic Sulfonic Acid | Wetting Times (Draves Test) in seconds | |
|---|---|---|
| | At pH=5 | At pH=11 |
| 0.05 | 78 | 56 |
| 0.10 | 37 | 24 |
| 0.25 | 16 | 32 |
| 0.50 | 8 | 29 |

It will be evident that the monosulfonated unsaturated acid can be neutralized with any other desired base, inorganic or organic, so as to produce mono salts of the monosulfonated acids with varying solubilities in water and other solvents and varying wetting characteristics as may be preferred for particular uses. Thus, for example, the potassium, ammonium, monoethanolammonium, triethanolammonium, etc., salts of monosulfonated oleic acid were prepared and were found to possess the following wetting characteristics (Draves test) in 0.5% aqueous solution at room temperature:

| Mono Salt of Monosulfonated Oleic Acid | Wetting Times (Draves), seconds |
|---|---|
| potassium, K⁺ | 21 |
| ammonium, NH₄⁺ | 18 |
| monoethanolammonium, HOCH₂CH₂N⁺H₃ | 20 |
| triethanolammonium, (HOCH₂CH₂)₃N⁺H | 18 |
| sodium, Na⁺ (for comparison) | 8 |

Although as already stated the esters of the unsaturated carboxylic acids cannot be monosulfonated in the above described manner, we have discovered that the free monosulfonated acids themselves can readily be esterified at the carboxyl group with a wide variety of alcohols, including primary and secondary monohydric and polyhydric alcohols, substituted or not, yielding monosulfonated esters having very desirable properties. The desired alcohol can be added directly to the sulfonation mixture, or the SO₂ may first be removed from the latter. Preferably the bulk of the SO₂ is first removed by warming the sulfonation mixture to a temperature of about 5° C.–10° C. No external heating or cooling is required for the esterification, but the temperature of the mass will rise somewhat due to heat of reaction. Using only a slight excess of alcohol, say 1.25 moles, the esterification reaction is practically complete in about two hours under these conditions, and the time required can be greatly reduced by using larger amounts of alcohol as shown hereinafter. The yields are very high (90–95%) and esters of high purity and quality are obtained. Analysis shows these esters to contain no organic SO₃ as sulfate, all of the SO₃ being sulfonate as in the case of the free monosulfonated acids.

When it is desired to use larger amounts of an alcohol to effect the esterification, the recovery of excess alcohol used becomes economically attractive. This recovery can be satisfactorily accomplished by distilling the alcohol together with water, after neutralization as described above, preferably as an azeotrope. Thus in the case of n-propanol esters, the excess n-propanol can be recovered as an azetrope with water boiling at 87.7° C., being composed of 28% water and 72% n-propanol.

For obvious economic reasons it becomes of interest to use mixtures containing 72–75% n-propanol and 25–28% water as an alcoholic mixture suitable for the esterification of the carboxyl groups of monosulfonated carboxylic acids. As shown in the examples this can be done conveniently, thereby achieving a considerable saving in required raw materials.

The salts of monosulfonated esters prepared in the above manner exhibit exceptional surface active and wetting properties. These salts are easily prepared by neutralizing the monosulfonated esters with NaOH or other bases such as NH₃, KOH, alkanolamine, etc. For example, the following table shows the results of wetting tests (Draves) with aqueous solutions of the sodium salts of various esters of monosulfonated oleic acid of 0.1% concentration in water at room temperature:

| Ester: | Wetting time, seconds |
|---|---|
| Methyl | 25 |
| Ethyl | 9 |
| n-Propyl | 5 |
| Iso-propyl | 12 |
| n-Butyl | 5 |
| n-Amyl | 12 |
| n-Hexyl | 28 |

Remarks: Optimum size of ester chain is n-propyl or n-butyl. Iso-propyl ester is less effective than n-propyl ester.

The monosulfonated esters of unsaturated carboxylic acids also retain their excellent wetting characteristics in acid and basic media and in hard water, as shown in the following table for the n-propyl ester of the sodium salt of monosulfonated oleic acid:

| Percent Oleate | Wetting Time, seconds (Draves), in— | | | |
|---|---|---|---|---|
| | Dist'd Water | Hard Water* | 2% H₂SO₄ | 1% NaOH |
| 0.025 | 60 | 73 | 67 | 130. |
| 0.05 | 17 | 16 | 32 | 30. |
| 0.10 | 5 | 6 | 6.5 | 9. |
| 0.20 | 1.5 | 1.5 | 1 | 2.5. |
| 0.50 | less than 1 | less than 1 | less than 1 | less than 1. |

* 300 p. p. m. hardness.

Aside from possessing good wetting characteristics, esters of the above types are structurally suited as "Twitchell" type reagents and as rewetting agents used in the sanforizing process for cotton. For example, the n-propyl ester of the sodium salt of monosulfonated oleic acid has a rewetting time of 64 seconds when used in a concentration of 1% on cloth and 16 seconds when used in a concentration of 3% on cloth (AATCC drop test).

In some instances dark ester products may be encountered, especially as a result of using low-grade starting materials such as low grade oleic acid containing polyunsaturated carboxylic acids, or tall oil fatty acids. It has been found that such products can be effectively bleached and improved in odor by neutralizing the esters to only about pH 6–7 with caustic or other base and then continuing the neutralization to pH 8 by means of a hypochlorite. Sodium hypochlorite solution, among others, is especially effective. This procedure, for unknown reasons, produces better bleaching than when the bleaching agent is added to a monosulfonated ester of a carboxylic acid first neutralized to pH 8 by caustic or other base.

Furthermore, it may be desirable in some instances to extract the monosulfonated acid or its ester from unreacted materials, although for many purposes this is unnecessary because of the small amount of the latter. When extraction is desired, however, the sulfonated material is first neutralized with the desired base, after which the unreacted oily materials are separated by means of a suitable oil solvent such as petroleum ether, a saturated hydrocarbon solvent, etc.

In contrast to the excellent, unanticipated results obtained with esters prepared as described above, very inferior compounds are obtained by the action of SO₃ directly on the esters of the unsaturated acids. When $SO_3$, per se or in a solvent or as oleum, is allowed to react with such esters, the carbyl sulfate reaction takes place as described above, requiring 2 moles of $SO_3$ per mole of unsaturated acid to yield a high degree of sulfonation. One mole of $SO_3$ reacted with one mole of the ester of an unsaturated fatty acid will result in only 50% or less conversion, in contrast to the near completeness of reaction observed when the free unsaturated fatty acid itself is used with $SO_3$ in $SO_2$. These facts are illustrated by the following table:

SULFONATION OF n-PROPYL OLEATE WITH VARYING AMOUNTS OF $SO_3$

| Run No.[a] | Moles $SO_3$ | Moles Propyl Oleate [b] | Percent of Total Oil Sulfonated |
|---|---|---|---|
| 1 | 1.00 | 1.0 | 42.0 |
| 2 | 1.34 | 1.0 | 63.4 |
| 3 | 1.47 | 1.0 | 67.0 |
| 4 | 2.62 | 1.0 | 87.5 |
| 5 | 3.00 | 1.0 | 88.0 |

[a] Runs 1, 2, 3, and 4 were made on spinning disc. Run 5 was made batchwise.
[b] Minimum purity, 90%.

Not only does the nearly complete sulfonation of esters of oleic and other unsaturated fatty acids require twice as much $SO_3$ as the monosulfonation of the free, unesterified unsaturated fatty acid, but the performance characteristics of the resulting products are also inferior as shown by the following wetting tests (Draves) of the sodium salt of sulfonated-sulfated n-propyl oleate in water at room temperature.

| n-Propyl Oleate Sulfonate-Sulfate | Wetting Time, seconds, 0.5% conc. | Rewetting Time, seconds | |
|---|---|---|---|
| | | 1% on Cloth | 3% on Cloth |
| Sample 2([a]) | 17.4 | 40.6 | 8.8 |
| Sample 4([b]) | 40.6 | 68.0 | 23.2 |

[a] From Run 2, preceding table.
[b] From Run 4, preceding table.

In contrast, the sodium salt of the monosulfonated n-propyl oleate prepared by the previously described process of esterifying the monosulfonated oleic acid with n-propanol has a wetting time of one second or less under the same conditions.

Analytical data have shown that these sulfonated-sulfated derivatives contain an amount of combined $SO_3$ about halfway between the theoretical values for the saturated monosulfonated hydroxy derivative (Equation 8) and the sulfonate-sulfate (Equation 7). Thus, in the case of the n-propyl ester the $SO_3$ content was found to be 25.0%. The hydroxy-sulfonate has a theoretical $SO_3$ content of 18.0% whereas the sulfonate-sulfate has a calculated $SO_3$ content of 30.5%.

The following examples illustrate the method of preparation of the monosulfonated products described above:

EXAMPLE 1

*Monosulfonation of oleic acid*

One hundred seventy-five grams of a commercially available grade of oleic acid containing less than 5% polyunsaturated acids and about 8–10% saturated fatty acids, together with 62.5 grams of $SO_3$, dissolved in 468 ml. of liquid $SO_2$, were run onto the surface of a spinning disc sulfonator at equivalent rates from separate feed tanks, as described in the aforesaid pending application, Serial No. 182,730. The reaction takes place very rapidly under atmospheric pressure and at temperatures in the neighborhood of $-10°$ C.

After the very rapid reaction was completed the reaction mixture was stripped of sulfur dioxide until the temperature of the crude reaction product had risen to $10°$ C. Subsequently, 50 ml. of water were added while simultaneously bringing the temperature to 40–45° C. by means of a hot water bath or other convenient means of externally applied heat. Good agitation was continued for 15 minutes to expel most of the remaining sulfur dioxide, and air was then sucked through the system under vacuum from a water aspirator pump for 15 minutes to remove residual sulfur dioxide. At this point the aqueous acid was a viscous dark brown material. To prepare the monosodium salt of the monosulfonated oleic acid 31.3 grams of sodium hydroxide dissolved in 125 ml. of water were added. The pH of the final solution should be adjusted to about 5 or 6 to insure complete neutralization of the sulfonic acid group. At the end of this period the mixture was of a clear reddish to orange color.

As shown in the preceding description, the product produced by the above procedure has good surface active properties and wetting characteristics; also the substitution of other bases for NaOH forms any desired mono salt of the sulfonate, either organic or inorganic. These materials are marked by unusual stability in neutral, acid or basic media, hot or cold.

If desired the mono salts obtained by the above procedure can be purified by extraction of unsulfonated oils, as illustrated by the following example. One hundred fifty-one grams of a 50% aqueous solution of the monosodium salt of the sulfonated oleic acid prepared in the above manner was extracted with 200 ml. of petroleum ether. After vigorous shaking, the thick emulsion broke rapidly into two clean layers. The first petroleum ether extract contained 6 grams of unsulfonated oil. A second extraction with 75 ml. of petroleum ether yielded 1.3 grams and a third extraction produced only 0.8 gram of unreacted oil. The extracted unsulfonated oils were apparently rich in stearic acid since after removal of the petroleum ether a solid, waxy, fatty acid was left behind. After removal of the petroleum ether from the aqueous layer containing the Na salt of the sulfonated oleic acid, a product was obtained which produced clear solutions even in hard water of 300 p. p. m. hardness.

EXAMPLE 2

*Monosulfonation of dimerized linoleic acid*

Dimerized linoleic acid, commonly referred to in the industry as dimer acid, is by nature a thick, tacky, dark colored oil and is supposed to have the following structure:

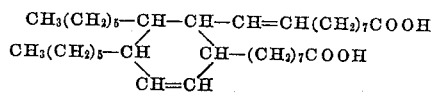

188 grams of dimer acid were thinned by diluting with 40 ml. of diethyl ether. 31.4 grams of sulfur trioxide in 484 ml. of liquid sulfur dioxide were added at equivalent rates from separate feed tanks onto the spinning disc sulfonator. This amount of $SO_3$ was equivalent to 1.25 moles per mole of dimer acid. The sulfur dioxide was removed after reaction as described in Example 1. Then 50 ml. of water were added whereupon the temperature reached 10° C. The temperature was then raised to 50° C. for 15 minutes by the application of external heat and the product was swept free of residual sulfur dioxide by means of a current of air supplied by the vacuum of a water aspirator pump. The addition of 18 grams of sodium hydroxide dissolved in 65 ml. of water brought the pH to 5–6. The residual ether was distilled off and the remaining thick liquid was poured from the flask and allowed to stand for several days in a glass bottle whereupon another small water layer separated which was drawn off and discarded. The final concentration of the sodium salt of sulfonated dimer acid was about 75%. It was found to be soluble in tap water producing an opalescent solution. The wetting time of 0.5% solution (Draves test) at room temperature was 7120 seconds. This high value is to be expected because of the large size of the molecule. Its rewetting time (AATTC drop test) was 75 seconds for 1% on cloth and 38 seconds for 3% on cloth.

As in the above examples, neutralization of the sulfonic acid can be done with inorganic or organic bases by substitution for NaOH in the neutralization step.

EXAMPLE 3

*Monosulfonation of tall oil fatty acids and low grade oleic acid*

A sample of commercially available tall oil fatty acid having the following approximate composition,

|  | Percent |
|---|---|
| Oleic acid | 50 |
| Linoleic acid (di-unsaturated) | 40 |
| Linolenic acid (tri-unsaturated) | 4 |
| Rosin (chiefly abietic acid type) | 6 | was sulfonated in a manner identical with that used for oleic acid in Example 1. A conversion of 75% resulted. The wetting times and surface activity of an aqueous solution of the monosodium salts of this mixture of sulfonated acids were very good though somewhat inferior to the product obtained from a purer grade of oleic acid (Example 1).

Similarly, another commercially available sample of tall oil fatty acid having the following composition

|  | Percent |
|---|---|
| Oleic acid | 46 |
| Linoleic | 39 |
| Linolenic acid | 3 |
| Rosin | 12 | was sulfonated as described in Example 1. The results of performance tests of this mixture of sulfonated products were as good as those obtained with tall oil fatty acids containing only 6% rosin.

Similarly, grades of oleic acid poorer in quality than that described in Example 1 can be used in this process. Such poorer grades of oleic acid usually contain quantities of di and polyunsaturated acids in excess of 5%. A 0.5% aqueous solution of the monosodium salt of this monosulfonated acid had a wetting time of 25 seconds (Draves test) at room temperature compared with 8 seconds found for the product derived from a purer grade of oleic acid (Example 1).

EXAMPLE 4

*Monosulfonation of crotonic acid* $(CH_3CH=CH-COOH)$

Eighty-five grams of commercially available crotonic acid were dissolved in 250 ml. of liquid sulfur dioxide in a three neck round bottom flask. 98.8 grams of sulfur trioxide dissolved in 250 ml. of sulfur dioxide was dropped into the $SO_2$ solution of crotonic acid during a 9 minute period. Little reaction was apparent. The solution retained a light straw color. The bulk of the $SO_2$ was evaporated after addition of the $SO_3$ by running tap water over the outside of the flask and the temperature of the reaction mass was brought up slowly to 45° C. by means of a warm water bath. At this point the temperature rose very rapidly to 90–100° C. due to heat of reaction. Apparently, crotonic acid is less reactive than the higher molecular weight unsaturated acids. After the reaction had subsided and the temperature had fallen to about 40° C., 100 ml. of water was slowly added, dropwise, with stirring of the reaction mixture. 49.5 grams of sodium hydroxide dissolved in 150 ml. of water was then added slowly and the final clear solution, having a pH of 2 was extracted twice with 250 ml. portions of diethyl ether. Evaporation of the ether showed that 10 grams of an unreacted material had been extracted. 41.5 grams of sodium hydroxide dissolved in 150 ml. of water were added to bring the reaction mixture to pH 9. The solution was evaporated to dryness and the crude disodium salt of monosulfonated crotonic acid was further purified by dissolving it in 95% acetic acid which served to remove the remaining inorganic matter. The filtrate containing the sulfonated crotonic acid derivative was freed of acetic acid and the residue dried in an oven. Analysis showed that the product contained 35.6% $SO_3$, the theoretical for the anhydrous disodium salt being 38.1 and for the monohydrate being 35.0%. This amounted to a conversion of crotonic acid to the monosulfonated derivative of 85–90%.

Bases, other than NaOH, both inorganic and organic, such as $NH_3$, KOH, alkanolamines, etc., can be used in place of NaOH to neutralize the monosulfonate of crotonic acid.

EXAMPLE 5

*Monosulfonation of undecylenic acid (10-undecene 1-oic acid)* $(CH_2=CH(CH_2)_8COOH)$ 42.9 grams of $SO_3$ dissolved in 200 ml. of liquid $SO_2$ were added in 5.5 minutes to 78.5 grams of undecylenic acid dissolved in 300 ml. $CO_2$ contained in a 1 liter round bottom pyrex flask. After completion of the reaction the bulk of the $SO_2$ was removed by stirring the product mixture and simultaneously running water over the outside of the flask. When the temperature reached 5° C. solidification of the products resulted and subsequently 200 ml. of water were added, with little or no generation of heat. The aqueous product solution was heated to boiling to remove the remainder of the dissolved sulfur dioxide. Then the product solution was cooled to 30° C. whereupon about one gram of resinous by-product precipitated which was removed. The clear solution was extracted with 2 portions 150 and 75 ml., respectively, of petroleum ether. This treatment resulted in the extraction of only 2.2 grams of unsulfonated material. The aqueous solution was then neutralized to pH 4–5 with 21.5 grams of sodium hydroxide in 50 ml. of water. One-fourth of the neutralized liquid was neutralized further to pH 9–10. This neutralization required 12.8 grams sodium hydroxide which is nearly the theoretical quantity required for the complete neutralization of all carboxyl groups. The remaining original aqueous solution of the monosodium salt of sulfonated undecylenic acid upon standing deposited white crystals which after drying and recrystallization from acetic acid melted at 193–203° C. The sulfur trioxide content of the monosodium salt was found to be 26.6% by the Parr Bomb method, the theoretical value for the anhydrous salt being 27.9% and for the monohydrate 26.3%. The acid equivalent calculated on a dry basis was found to be 94% of theory and nearly 100% of theory based on the monohydrate.

Bases both inorganic and organic can be substituted for NaOH to produce a variety of salts.

EXAMPLE 6

*Preparation of carboxylic acid esters of monosulfonated oleic acid*

Oleic acid was sulfonated as in Example 1 on a disc sulfonator or batchwise. After the sulfonation reaction was complete and when the bulk of the sulfur dioxide had been driven off and the temperature had reached 10° C., 5 moles of the desired alcohol were added and the mixture allowed to stir for 2 hours. No external heat or cooling was applied during this period. The temperature rose to about 35–40° C. due to the heat of reaction. At the end of this 2 hour period the mass was swept 15 minutes by pulling air through the mixture to remove residual $SO_2$, using the water pump for suction. The acid was then neutralized by adding a 25% NaOH solution keeping the temperature under 35° C. with an ice bath. One mole of NaOH per mole $SO_3$ usually brought the pH to 7–8.

Removal of the excess alcohol was accomplished by distillation at atmospheric pressure, the pot temperature not being allowed to exceed 105° C. In most cases additional water had to be added to distill off the azeotrope, alcohol-water. After distillation the pH usually dropped to 5-6, but only a small amount of NaOH was needed to bring the pH back to 8-9. For purposes of consistency and comparison all products were adjusted to a 50% water content after distillation and neutralization, although any concentration in water up to at least 80% of sulfonated product can be obtained by this process.

Wetting times for a number of different esters of monosulfonated oleic acid prepared in the above manner have already been set forth.

These products were also analyzed for oil by the customary method previously mentioned, i. e., by extraction of aqueous solutions with petroleum ether. In some cases a little methanol had to be added to the aqueous solution to cause a clean separation. The petroleum ether layer was washed with water to remove traces of water-soluble material. A pinch of NaCl helped break the layers. The following table summarizes the results obtained of these analyses:

75% n-propanol was suitable for reuse in succeeding esterifications.

The product, the sodium salt of monosulfonated n-propyl oleate, was a light yellow fairly mobile liquid consisting of 76% product and a lesser amount of inorganic salts and 24% water and traces of alcohol. It possessed essentially the same excellent wetting properties, clarity in solution and pleansant odor as was obtained through the use of essentially anhydrous n-propanol.

It will be understood that the esterification conditions described in Example 6 can be varied widely with respect to the amount of alcohol used and the time and temperature of esterification. In general, lower mole ratios of alcohol to acid present the advantage of having little or no alcohol to recover, whereas higher mole ratios usually yield somewhat better products as to color and wetting time and permit esterification to be completed in a shorter time with somewhat less oil in the finished product. Nevertheless excellent products can be obtained under widely varying conditions of esterification, as illustrated by the following table which shows the effect of

ESTERS OF SULFONATED OLEIC ACID

| Alcohol Used | Gms. SO$_3$ | Gms. Oleic Acid | Gms. Alcohol | Gms. NaOH to pH 8 | Gms. H$_2$O in Run | Esterification | | Conversion to Ester, Percent | Oil in 50% Aqueous Product, Percent | Nature of 50% Product |
|---|---|---|---|---|---|---|---|---|---|---|
| | | | | | | Time, Hrs. | Temp., °C. | | | |
| Methyl | 54.8 | 155 | 80 | 29.9 | 231.7 | 2¼ | 25-43 | 90-95 | 8.4 | liquid. |
| Ethyl | 53.2 | 150 | 122.5 | 27.58 | 233.7 | 2¼ | 28-41 | 90-95 | 7.6 | Do. |
| n-Propyl | 46.97 | 144.6 | 165 | 26.0 | 226 | 2¼ | 25-38 | 90-95 | 8.0 | Do. |
| iso-Propyl | 52.1 | 147 | 156.5 | 44 | 223 | 2¼ | 27-36 | 25-30 | 6.0 | Do. |
| Do | 49.5 | 140 | 150 | 26.3 | 225.5 | 1 | 75-90 | 90-95 | 12.8 | Do. |
| n-Butyl | 51.7 | 146 | 199 | 26.9 | 252.7 | 2¼ | 28-38 | 90-95 | 9.0 | Do. |
| n-Amyl | 44.7 | 126 | 171 | 23.4 | 214 | 2¼ | 27-39 | 90-95 | 13.2 | semi-gel. |
| n-Hexyl | 50.1 | 141 | 255 | 27.0 | 246 | 2¼ | 27-36 | 90-95 | 19.7 | stiff-gel. |

As a more specific illustration of the esterification procedure outlined above, the sulfonation of oleic acid was conducted as described in Example 1 using 51.9 parts of variations in the mole ratio of alcohol to acid and in reaction time on the yield and quality of the sodium salt of monosulfonated n-propyl oleate.

ESTERIFICATION OF MONOSULFONATED OLEIC ACID WITH n-PROPYL ALCOHOL

| Run No. | Moles Alcohol per Mole Oleic Acid | Moles NaOH per Mole SO$_3$ to pH9 | Esterification | | Percent Oil on 50% Sample | Wetting Time in Seconds for a .1% A. I. Soln. | | Clarity at All Concent's Below 50% | Color of 50% Solution (Without Bleach) |
|---|---|---|---|---|---|---|---|---|---|
| | | | Time, Hrs. | Temp., °C. | | pH9 | pH2 | | |
| 1 | 1.25 | 1.38 | 2¼ | 25-40 | 6.4 | 16 | 7 | clear | dark orange. |
| 2 | 2.0 | 1.16 | 2¼ | 25-40 | 6.4 | 14 | 8 | do | Do. |
| 3 | 2.0 | 1.14 | 2¼ | 45 | 7.0 | 15 | 8 | do | Do. |
| 4 | 3.0 | 1.15 | ¼ | 25-90 | 7.4 | 10 | 6 | do | reddish orange. |
| 5 | 3.0 | 1.15 | ½ | 25-40 | 7.1 | 12 | 10 | do | dark orange. |
| 6 | 3.0 | 1.15 | ¾ | 25-40 | 7.0 | 10 | 8 | do | Do. |
| 7 | 3.0 | 1.15 | 1 | 25-40 | 6.8 | 9.5 | 7.5 | do | Do. |
| 8 | 3.0 | 1.10 | 2¼ | 25-40 | 10.2 | 8 | 6 | not clear | Do. |
| 9 | 5.0 | 1.35 | ¼ | 25-40 | 4.8 | 14 | 9 | clear | light orange. |
| 10 | 5.0 | 1.32 | ½ | 25-40 | 6.0 | 8 | 6 | do | Do. |
| 11 | 5.0 | 1.08 | 2¼ | 25-40 | 8.5 | 7 | 6 | not clear | dark orange. | liquid SO$_3$ dissolved in 474 parts of liquid SO$_2$ and 147 parts of commercial 90% oleic acid. After removal of the bulk of the SO$_2$, 156 parts n-propanol in 52 parts of water (75% alcohol by weight) was added and the temperature brought up to 75° C. in 12 minutes. After cooling to 35-40° C. in 10 minutes, the system was evacuated for 10 minutes using a water aspirator pump to remove residual SO$_2$. At this time the temperature was 20° C. and 34 parts of NaOH dissolved in 116 parts of water were added to neutralize the product to a pH of 9. The temperature during the neutralization never exceeded 40° C.

An azeotropic mixture of alcohol and water was removed followed by removal of some excess water by distillation. The distillate consisted of 118 parts of n-propanol and 113 parts of water (51% alcohol). This distillate when refortified with pure n-propanol to give a final aqueous n-propanol mixture consisting of As already stated, moreover, the monosulfonated esters can also be neutralized with NH$_3$, alkanolamine, etc., to provide valuable products. For example, after completion of the esterification with n-propanol, amines such as monoethanolamine, diethanolamine, triethanolamine, etc., were added to neutralize the sulfonic acid group and produce the corresponding substituted ammonium salts of monosulfonated n-propyl oleate. After neutralization with such organic bases, the excess n-propanol was distilled off leaving behind water-free salts of the monosulfonated esters. These salts were clear, fairly mobile, light amber liquids which were freely soluble in water and possessed excellent surface active properties. The mono, di and triethanolammonium salts are highly soluble in chlorinated solvents such as carbon tetrachloride, thus making them of value as surface active agents in non-aqueous media.

WETTING TIMES OF ETHANOLAMMONIUM SALTS OF MONOSULFONATED N-PROPYL OLEATE

[Concentration=0.1% in water at room temperature]

| Salt | Wetting Time (seconds), Draves Test |
|---|---|
| monoethanolammonium | 3.5 |
| diethanolammonium | 5.0 |
| triethanolammonium | 5.0 |

EXAMPLE 7

*Preparation of carboxylic acid esters of mixtures of monosulfonated mono and poly unsaturated acids*

A sample of a commercially available grade of oleic acid less pure than that used in Example 1, and containing more than 5% polyunsaturated carboxylic acids was sulfonated as described in Example 1 and reacted with n-propanol as described in Example 6. After distilling off the excess alcohol, sufficient sodium hydroxide was added to bring the pH to 7 and the concentration to 50%. At this time the 50% aqueous solution was of a dark red color, and since a lighter color was desired, the solution was bleached as described above by adding sufficient sodium hydrochloride solution to raise the pH to 8. The solution was then of a light orange color with a clean pleasant smell and possessed very good wetting characteristics as shown in the following table:

WETTING TIMES (DRAVES TEST)

| Percent Na Salt of Monosulfonated n-propyl Esters in Water | pH 8, seconds | pH 2, seconds |
|---|---|---|
| 0.1 | 26 | 15 |
| 0.25 | 6 | 5 |
| 0.5 | less 1 | 2 |

An extraction of the 50% aqueous solution of the sodium salt of the monosulfonated n-propyl esters prepared from this inferior grade of oleic acid showed an oil content of only 10%.

EXAMPLE 8

*Preparation of carboxylic acid esters of mono-sulfonated tall oil fatty acids*

Tall oil fatty acids having the following composition

| | Percent |
|---|---|
| Oleic acid | 50 |
| Linolic acid | 40 |
| Linolenic acid | 4 |
| Rosin acid | 6 | were sulfonated in a manner identical with that in Example 1 and esterified with n-propyl alcohol and neutralized in a manner identical with that in Example 6. Extraction of a 50% solution of a sodium salt of the monosulfonated n-propyl mixture of carboxylic acids showed only 8.4% of unreacted oils. The wetting characteristics of this product were still very good although not as good as those obtained with reagents of high quality. The following table gives the wetting characteristics found:

WETTING TIMES (DRAVES TEST)

| Percent Na Salt of Monosulfonated n-propyl Esters in Water | pH 8, seconds | pH 2, seconds |
|---|---|---|
| 0.1 | 20 | 20 |
| 0.25 | 8 | 8 |
| 0.5 | 2.5 | 2.5 |

The following additional examples illustrate the esterification of the monosulfonated carboxylic acids with poly and substituted alcohols:

EXAMPLE 9

In the already described manner 53.6 grams of liquid $SO_3$ dissolved in 475 ml. liquid $SO_2$ was run through the disc sulfonator at an equivalent rate with 151 grams of commercial grade (90%) oleic acid. After removal of the bulk of the $SO_2$ (temp. 5° C.) 33.2 grams of ethylene glycol (1 mole glycol per mole of monosulfonated oleic acid) was added and the temperature was taken up to 60° C. in 8 minutes. The heat was removed and while stirring well, the flask was partially evacuated with suction from a water aspirator for 15 minutes. After this time 27 grams NaOH dissolved in 100 ml. $H_2O$ was added slowly using an ice water bath to prevent the temperature from rising above 60° C. The pH of this mixture at this time was 6. Four grams of NaOH in 20 ml. $H_2O$ were added to bring the pH to 9. This clear orange liquid gave clear solutions in water and possessed a wetting time of 62 seconds for a 0.3% total solids solution (Draves test), at room temperature.

To the product was ascribed the following formula:

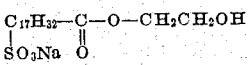

EXAMPLE 10

In the previously described manner, 53.6 grams of liquid $SO_3$ dissolved in 475 ml. liquid $SO_2$ were run through the disc sulfonator at equivalent rates with 151 grams of commercial grade (90%) oleic acid. After removal of the bulk of the $SO_2$ (temp. 5° C.) 16.6 grams of ethylene glycol (2 moles of sulfonated oleic acid to 1 mole of ethylene glycol) was added and the temperature taken up to 70° C. in 10 minutes. The heat was removed and while stirring well, the flask was partially evacuated with suction from a water aspirator for 15 minutes. At this time 27 grams of NaOH dissolved in 100 ml. $H_2O$ were added slowly, using an ice water bath to prevent temperatures in excess of 60° C. The pH at this time was 6 and 9 more grams of NaOH in 50 ml. $H_2O$ were necessary to raise the pH to 9. The clear orange liquid product gave clear solutions in water and was found to have a wetting time of 27 seconds for a 0.3% total solids solution (Draves test) at room temperature.

To the product was ascribed the following formula:

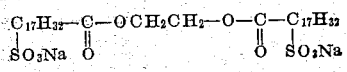

EXAMPLE 11

In the previously described manner 53.6 grams of liquid $SO_3$ dissolved in 475 ml. liquid $SO_2$ were run through the disc sulfonator at an equivalent rate with 151 grams of commercial (90%) oleic acid. After removal of the bulk of the $SO_2$ (temp. 5° C.) 49.3 grams of glycerol (1 mole of sulfonated oleic acid to 1 mole of glycerol) were added and the temperature taken up to 75° C. in 15 minutes. The heat was removed and while stirring well, the flask was partially evacuated with suction from a water aspirator for 15 minutes. Twenty-seven grams NaOH dissolved in 100 ml. $H_2O$ were added slowly using an ice water bath to keep the temperature as low as possible. Due to the difficulty in stirring and poor heat transfer, due to the viscosity of the product, the temperature rose as high as 70° C. during the neutralization. The pH at this time was 6 and after adding 5 grams NaOH dissolved in 27 ml. $H_2O$ the pH became 9. The clear, reddish-orange, very viscous liquid gave clear solutions in water and showed a wetting time of 83 seconds for a 0.3% total solids solution (Draves test) at room temperature.

The product was assigned the following structure:

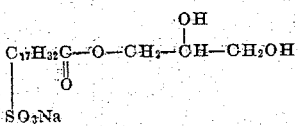

EXAMPLE 12

In the previously described manner 53.6 grams of liquid SO₃ dissolved in 475 ml. liquid SO₂ were run through the disc sulfonator at an equivalent rate with 151 grams of commercial (90%) oleic acid. After removal of the bulk of the SO₂ (temp. 5° C.) 71.8 grams of diethylene glycol monoethyl ether was added and the temperature taken up to 70° C. in 12 minutes. The heat was removed and while stirring well, the flask was partially evacuated with suction from a water aspirator for 15 minutes. Twenty-seven grams of NaOH dissolved in 100 ml. H₂O were added slowly while stirring and using an ice water bath to keep the temperature below 43° C. The pH at this time was 6 and 7 grams of NaOH dissolved in 30 ml. H₂O brought the pH to 9. This yellow-orange liquid gave clear solution in water and displayed a wetting time of 31.5 seconds for a 0.3% total solids solution (Draves Test) at room temperature.

The following structure was assigned to the product:

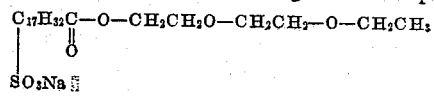

Thus it will be evident that the monosulfonated unsaturated carboxylic acids and their esters produced by the present invention possess not only remarkable stability against hydrolysis and heat but also outstanding surface active properties, so that they are eminently suited for use in acid, neutral or basic media as dispersing, clarifying, solubilizing, emulsifying, wetting, rewetting and detergent agents. For many purposes the monosulfonated acids themselves are well suited, but in other cases their esters may be preferred. In the latter case esterification can be integrated with sulfonation in a continuous process, the alcohol being added during the removal of the SO₂ from the sulfonated acid and before neutralization. Under these conditions the free sulfonic acid groups of the monosulfonated acids appear to catalyze the reaction between their free carboxyl groups and the alcohols, thus greatly facilitating the esterification.

EXAMPLE 13

In order to demonstrate the emulsifying ability of compounds embodying the invention, the sodium and triethanolammonium salts of mono-sulfonated n-propyl oleate (NaPO and TEAPO respectively) were used in preparing emulsions of the herbicides isopropyl N-(3-chlorophenyl) carbamate (Cl-IPC) and isopropyl N-phenyl carbamate (IPC). A 0.5 gram sample of the herbicide was dissolved in an emulsifier-inert solvent mixture and enough distilled water was added to form about a 1% emulsion of the active ingredient, i. e., the herbicide. The stability of these emulsions was observed visually with the following results:

20 ml. samples of the various formulations were diluted with water to 100 ml. with the following results:

EMULSIFICATION OF VARIOUS INSECTICIDES IN TAP WATER

| Emulsifying Agent | Insecticide | Formulation | Stability of Water Emulsion |
|---|---|---|---|
| TEAPO | DDT | 25% DDT, 10% TEAPO, and 65% Xylene. | approx. 3 hours, easily reemulsifiable. |
| NaPO | DDT | 25% DDT, 10% NaPO, and 65% Xylene. | Do. |
| TEAPO | Toxaphene | 25% Toxaphene, 10% TEAPO and 65% Xylene. | approx. 2 hours, easily reemulsifiable. |
| NaPO | ---do--- | 25% Toxaphene, 10% NaPO, and 65% Xylene. | Do. |
| TEAPO | BHC | 12% BHC, 10% TEAPO, and 78% Xylene. | Do. |
| NaPO | BHC | 12% BHC, 10% NaPO, and 78% Xylene. | more than 91 hours. |
| TEAPO | Aldrin (85%) | 28% Aldrin, 10% TEAPO, 62% Xylene. | more than 19 hours. |
| NaPO | ---do--- | 28% Aldrin, 10% NaPO, and 62% Xylene. | Do. |
| TEAPO | Dieldrin (88%) | 18% Dieldrin, 10% TEAPO and 72% Xylene. | more than 21 hours. |
| NaPO | ---do--- | 18% Dieldrin, 10% NaPO, 72% Xylene. | Do. |

In the foregoing table, DDT is dichloro-diphenyl-trichloroethane; Toxaphene is a mixture containing polychloro bicyclic terpenes with chlorinated camphene predominating; BHC is hexachlorocyclohexane; Aldrin is the assigned common name for an insecticidal product containing not less than 95% hexachloro-hexahydro-dimethanonaphthalene; and Dieldrin is the assigned common name for an insecticidal product containing not less than 85% of hexachloro-epoxy-octahydro-dimethanonaphthalene.

EXAMPLE 14

The emulsifying agents mentioned above (NaPO and TEAPO) are also effective in water having a hardness up to about 300 p. p. m., but thereafter begin to lose effectiveness so that one of the known chelating agents such as Versene or Sequestrene (ethylene diamine tetra-acetic acid) should be used, especially above 500 p. p. m. For example, regular Versene (ethylene diamine tetra-acetic acid) was added in varying amounts to 2.0 gram samples containing 48% Cl-IPC; 10% TEAPO, 10%

SATISFACTORY EMULSIFIABLE CONCENTRATES OF IPC AND Cl-IPC IN DISTILLED WATER

| Active Compound | Emulsifying Agent | Solvent | Weight Ratio in Concentrate Act.Cpd:Emul. Agt:Solvt. | Appearance of Concentrate | Stability of Water Emulsion |
|---|---|---|---|---|---|
| Cl-IPC | NaPO (65%) | xylene | 1:1*:3 | clear light yellow | 42 hours.** |
| Cl-IPC | TEAPO (85%) | isopropanol | 1:2*:4 | clear yellow | 22 hours.** |
| IPC | NaPO (65%) | xylene | 2:3*:8 | cloudy | 4 days.** |
| IPC | TEAPO (85%) | ---do--- | 2:3*:8  1.2 H₂O<br>5:3*:17  2 H₂O | ---do--- | 16 hours**—very slightly broken after 24 hours. Reemulsified easily. |

*Refers to active ingredient solution—not to 100% active ingredient.
**Stable beyond period indicated here, observations were stopped at this point.

Similar results were obtained in emulsifying various known insecticides in fairly soft tap water (40–60 ppm.).

methyl isobutyl ketone, 25% xylene, and 7% kerosene, each sample being then diluted to 100 ml. with water having a hardness of 1000 p. p. m. The results were as follows:

EMULSIFICATION OF Cl-IPC IN HARD WATER USING VERSENE (REGULAR) AS COMPLEXING AGENT

| Grams of Versene | Stability of Water Emulsion |
|---|---|
| 0.2 | approximately 1 hour. |
| 0.4 | Do. |
| 0.6* | more than 42 hours. |
| 0.8 | approximately 17 hours. |
| 1.0 | less than 17 hours. |
| 1.5 | approximately 1 hour. |

*All ions complexed; theoretical amount of Versene needed to complex all hard ions=0.43 grams.

Similarly varying amounts of regular Versene were added to 10 ml. samples each containing 25% of one of the following insecticides, 10% TEAPO, 50% xylene, 10% methyl isobutyl ketone and 5% kerosene, after which the samples were diluted to 100 ml. with hard water (1000 p. p. m.). The following results were obtained:

EMULSIFICATION OF VARIOUS INSECTICIDES IN HARD WATER USING TEAPO AND VERSENE (REG.)

| Insecticide | Grams Versene | Stability of Water Emulsion |
|---|---|---|
| DDT | 0.1 | approximately 1 hour. |
| DDT | 0.2 | Do. |
| DDT | 0.3 | approximately 5 hours. |
| DDT | 0.4 | approximately 40 hours, reemulsified easily. |
| BHC | 0.1 | approximately 30 minutes. |
| BHC | 0.2 | approximately 4 hours. |
| BHC | 0.3 | Do. |
| BHC | 0.4 | approximately 40 hours, reemulsified easily. |
| Toxaphene | 0.1 | approximately 2 hours. |
| Do | 0.2 | Do. |
| Do | 0.3 | Do. |
| Do | 0.4 | approximately 24 hours, reemulsified easily. |

For some materials such as Cl–IPC, the addition of a small amount of a non-ionic surface active agent such as Renex (a condensation product of tall oil with ethylene oxide) results in better and more stable emulsion, although the agent itself may be an inferior emulsifying agent in the particular system involved. This is shown by the following tests in which the specified amounts of Cl–IPC were added to a concentrate containing 0.2 gram TEAPO, 0.2 gram Renex, 0.4 gram xylene, 0.1 gram methyl isobutyl ketone, 0.1 gram kerosene, and 0.3 gram Versene, and the whole diluted to 100 ml. with hard water:

| No. | Grams Cl-IPC | In conc., Wt. Percent Cl-IPC | Stability of Water Emulsion |
|---|---|---|---|
| 1 | 0.40 | 23.5 | approximately 24 hours. |
| 2 | 0.50 | 27.8 | Do. |
| 3 | 0.60 | 31.6 | Do. |
| 4 | 0.70 | 35.0 | approximately 1 hour. |
| 5 | 0.80 | 38.1 | approximately ½ hour. |

Run number 3 was the best emulsion obtained.

It will be understood that the invention is not restricted to the specific acids and alcohols named above by way of example, nor to the details of the illustrative examples of the process. Reference should be had to the appended claims for a definition of the limits of the invention.

What is claimed is:

1. A process for the production of monosulfonated unsaturated aliphatic carboxylic acids which comprises sulfonating an unsaturated aliphatic carboxylic acid with sulfur trioxide dissolved in liquid sulfur dioxide in the proportion of 1.0–1.25 moles of sulfur trioxide per mole of unsaturated acid, and separating the sulfur dioxide from the sulfonated material comprising free carboxylic acid characterized by retention of at least 40% of the unsaturation prior to sulfonation and by approximately one mole of organically combined sulfur trioxide per mole of acid.

2. A process as defined in claim 1, wherein the sulfonated material is neutralized by the addition of a base to the sulfonation mass.

3. A process as defined in claim 2, including the step of separating unsulfonated materials from the neutralized sulfonated materials by solvent extraction of the mass.

4. A process as defined in claim 1, including the step of esterifying the free carboxylic acid groups of the sulfonated material by adding at least one mole of an alcohol to the sulfonation mass, said alcohol being selected from the group consisting of substituted and unsubstituted primary and secondary monohydric and polyhydric alcohols.

5. A process as defined in claim 4, wherein the esterified sulfonated material is neutralized by the addition of a base to the reaction mass.

6. A process as defined in claim 5, wherein sufficient base is added to raise the pH of the reaction mass to about 5.0–7.0, after which sufficient hypochlorite is added further to raise said pH to about 8.0–9.0.

References Cited in the file of this patent

UNITED STATES PATENTS

| 1,923,608 | Bertsch | Aug. 22, 1933 |
| 1,986,808 | Greenhalgh | Jan. 8, 1935 |
| 2,195,145 | Crittenden | Mar. 26, 1940 |
| 2,240,920 | Werntz | May 6, 1941 |